(No Model.)
H. P. KOCHSMEIER.
SPRING HINGE.
No. 282,993. Patented Aug. 14, 1883.
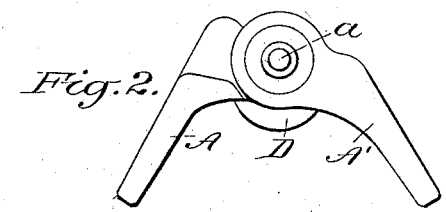
Fig. 2.
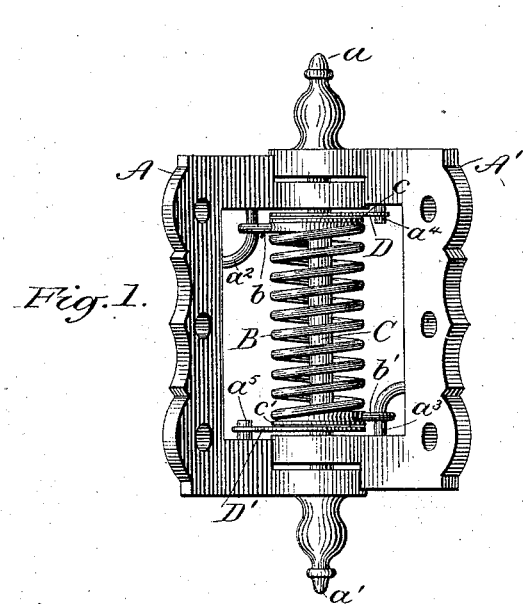
Fig. 1.
Fig. 3.
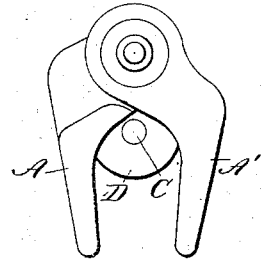
Fig. 4.
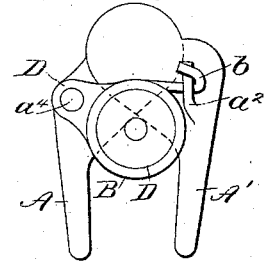
Fig. 5.
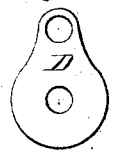
Witnesses.
E. L. Thurston.
Emery J. Walker
Inventor.
Henry P. Kochsmeier
By Hill & Dixon
Attorneys.

UNITED STATES PATENT OFFICE.

HENRY P. KOCHSMEIER, OF FREEPORT, ILLINOIS, ASSIGNOR TO LEVI M. DEVORE AND ISAAC F. KLECKNER, OF SAME PLACE.

SPRING-HINGE.

SPECIFICATION forming part of Letters Patent No. 282,993, dated August 14, 1883.

Application filed March 8, 1883. (No model.)

*To all whom it may concern:*

Be it known that I, HENRY P. KOCHSMEIER, of the city of Freeport, county of Stephenson, and State of Illinois, have invented a new and useful Improvement in Spring-Hinges for Window-Blinds, Doors, &c., of which the following is a description, reference being had to the accompanying drawings, in which—

Figure 1 is a plan view, and Fig. 2 an end view, of the improved hinge when partly opened. Fig. 3 is an end view, and Fig. 4 a cross-section, of the hinge when the leaves thereof are folded back. Fig. 5 is a detailed view of the link hereinafter described.

Like letters represent like parts in the various figures.

The object of my invention is to provide a simple, cheap, and durable spring-hinge, applicable to window-blinds, doors, gates, &c., in which the force of the spring is applied to hold the blind or swinging part closed, and to resist its opening until it shall have passed the "dead-center," when the tension of the spring tends to force the blind fully open and to retain it in that position.

To this end my invention consists in a spring-hinge provided with a longitudinal coiled spring attached directly at each end to both leaves of the hinge, to one leaf by a projecting hook and to the other leaf by a short connecting-link, or its equivalent, all of which will be hereinafter more fully described, and pointed out definitely in the claim.

In the drawings, A A' are the two leaves of the hinge united by pintles $a$ $a'$ in any of the usual forms of construction. A coiled spring, B, is inserted between the leaves A A'; but instead of being mounted upon the pintles, it is detached therefrom and connected directly to the leaves. The wire forming the coiled spring is at each end bent into hooks $b$ $b'$, upon opposite sides of the spring. These hooks engage in pins or loops $a^2$ $a^3$ upon each leaf at the opposite ends thereof. Were there no other attachment of the spring to the hinge, the tension of the spring would cause it to be thrown around to an angle with the line of the axis of the pintles and out of parallel with the leaves, and the hinge would be inoperative. To overcome this difficulty I provide a second attachment at each end of the spring, and to the opposite leaf in each case from the one to which the spring is attached by the hook $b$ at one end and the hook $b'$ at the other end, and the spring, being thus attached at both its ends to both the leaves of the hinge, is necessarily retained at all times in its movement parallel with the leaves.

In the form of attachment illustrated in the drawings, the spring is mounted upon an inclosed arbor, C, by means of flanged collars $c$ $c'$, one inserted within each end of the spring, and the arbor passed through holes in the center of each of the collars and projecting outside a short distance at each end. Short links D D', preferably of the general form shown in Fig. 5, being short thin bars with a hole in each end, are placed one upon each of the outer projecting ends of the arbor C, which pass through one of the holes in each link, and are then "headed down," so as to retain the links upon the ends of the arbor and yet permit one or both of them to turn slightly. The outer ends of the links D D' are then, by means of the holes therein, engaged in the pins $a^4$ $a^5$, upon the leaves opposite to the loops $a^2$ $a^3$, thus providing the spring at each end with a double attachment to the hinge, by a hook to one leaf and a link to the other leaf. This arrangement retains the spring in operation always parallel to the leaves, while it is carried by the movement of the leaves in opening or closing out of and back to the line of the axis of the pintles, and in such manner as to operate to hold the hinge open when it is fully opened and closed when it is fully closed.

I do not limit myself to the precise form of my invention illustrated in the drawings, as various changes in the details of construction may be made without departing from the principle of the invention. For example, if preferred, the links D D', instead of being provided with a hole in its outer end, may have the same fashioned into the form of a hook, so as to engage with a pin or loop upon the leaf in like manner with the hooks $b$ $b'$; or, instead of the arbor C being employed, the links D D' may be provided with projecting bearings upon their inner faces, upon which the collars $c$ are mounted directly; or the collars $c$ may be formed directly upon the inner face of the links D D'; but the form of construction shown in the drawings is deemed the preferable one.

Having thus described my invention, what I claim as new, and desire to secure by Letters Patent, is—

A spring-hinge provided with a longitudinal coiled spring attached at each end to one leaf by a projecting-hook and to the other leaf by a short connecting-link, substantially as described.

HENRY P. KOCHSMEIER.

Witnesses:
 HENRY M. BARNUM,
 LEVI M. DEVORE.